United States Patent [19]
Conti et al.

[11] Patent Number: 5,285,473
[45] Date of Patent: Feb. 8, 1994

[54] SYSTEM TO GENERATE SWITCHING CRITERIA AND EQUALIZE ADAPTIVELY IN DATA SPECTRUM

[75] Inventors: Adelio Conti, Montevecchia; Paolo Troyer, Sesto S. Giovanni; Rocco Nobili, Cassina de Pecchi, all of Italy

[73] Assignee: Telettra S.p.A., Italy

[21] Appl. No.: 604,791

[22] Filed: Oct. 26, 1990

[30] Foreign Application Priority Data

Oct. 27, 1989 [IT] Italy ............................ 22159 A/89
Oct. 27, 1989 [IT] Italy ............................ 22160 A/89
Oct. 31, 1989 [IT] Italy ............................ 22231 A/89

[51] Int. Cl.$^5$ .......................................... H04B 1/12
[52] U.S. Cl. ............................. 375/12; 375/102; 455/226.3; 455/304
[58] Field of Search .................. 375/10, 11, 12, 14, 375/40, 100, 99, 102, 91, 88; 455/67, 133, 134, 135, 226, 226.3, 303, 304; 329/327, 329, 332, 334, 338, 339, 340, 335; 371/5.1, 5.2, 5.5, 11.2; 324/77 A, 77 E, 78 F, 78 J

[56] References Cited

U.S. PATENT DOCUMENTS

| | | | |
|---|---|---|---|
| 4,039,953 | 8/1977 | Chadwick | 455/135 |
| 4,054,842 | 10/1977 | Elliott | 375/91 |
| 4,200,840 | 4/1980 | Tsui | 455/226 |
| 4,476,491 | 10/1984 | Murata et al. | 375/14 |
| 4,568,882 | 2/1986 | Single | 375/91 |
| 4,870,658 | 9/1989 | Suzuki et al. | 375/12 |
| 4,920,543 | 4/1990 | Martin | 455/67 |
| 5,065,410 | 11/1991 | Yoshida et al. | 375/12 |

OTHER PUBLICATIONS

G. L. Fenderson et al., "Recent Advances in Multipath Propogation Countermeasures for High-Capacity Digital Radio Systems", *Proceedings of the 1985 IEEE International Conference on Communications*, Jun. 23-26, 1985, vol. 3, pp. 1239-1243, NY, NY.

J. L. Osterholz, "Selection Diversity Combiner Design for Digital LOS Radios", *IEEE Transactions on Communication Technology*, vol. 27, No. 1, Jan. 1979, New York.

*Primary Examiner*—Benedict V. Safourek
*Attorney, Agent, or Firm*—Ostrolenk, Faber, Gerb & Soffen

[57] ABSTRACT

A system for detecting data spectrum distortion in a transmitted signal, in particular distortion caused by selective fading. The system includes: two blocks in parallel, which act on the spectrum average power of the input signal in an equal but opposite manner (i.e. they have equal slopes but act with opposite effect on the amplitude of the input signal versus frequency); two detectors which detect the average power output from the two respective blocks, each being associated with one of the blocks; and one comparitor for comparing the outputs of the two detectors. The system allows one to detect the asymmetries of the data spectrum and, by adding an AGC and a reference voltage, information related to the notch frequency $f_0$ is also obtained. The distortion measurement obtained in this manner allows one to generate a switching criterion, as a countermeasure for selective fadings in the transmitted signal.

7 Claims, 11 Drawing Sheets

TRANSMITTED SIGNAL SPECTRUM

TRANSMITTED
SIGNAL SPECTRUM

SYSTEM TO GENERATE SWITCHING CRITERIA AND EQUALIZE ADAPTIVELY IN DATA SPECTRUM

BACKGROUND OF THE INVENTION

1. Field of the Invention:

The present invention relates to a system for detecting data spectrum distortion in transmission, e.g. distortions caused by selective fading and, more particularly, to a system for detecting possible in-band dispersions, wherein dispersion means an amplitude dispersion.

2. Description of the Related Art:

Until today, the measurement of amplitude dispersion has been made by measuring the power of the data spectrum around 'n' frequencies; generally this measurement is carried out by 'n' frequency selective filters.

The obtained information is much more complete as 'n' increases; but this functional requirement conflicts with many other requirements, in particular the complexity involved in manufacturing frequency selective filters (band-pass filters, with a very narrow bandwidth) and, with the need to save space and to limit costs. Owing to these and other requirements, the number 'n' of filters that are used is typically limited to two or three.

If two filters are used, or in any case in which if 'n' is an even number, information regarding the dissymmetry of the data spectrum with respect to central frequency (fc) is, obtained, which is in any event, incomplete, as the channel bandwidth is sampled only in some points; hence the information is not "all band".

If there are three filters, or in any case in which 'n' is an odd number, it is possible to detect also the presence of fading with notch frequency equal to the frequency of the central band, but also in this case there is still the inconvenience of obtaining a measurement which not extended over the whole band.

SUMMARY OF THE INVENTION

The aim of the invention is to provide a particularly simple and efficient system that can be easily embodied and eliminates the inconvenience of the above-described methods using several filters and in particular permits one to obtain information over the "whole band", i.e. a measurement of the dispersion over the whole band that is less sensitive to the interference frequencies.

This and further objects are achieved by the system according to the invention, which is substantially based on identifying a dispersion over the whole band, or an amplitude distortion over the whole band (that is less sensitive to interference frequencies). The received signal is submitted to two distortions applied in parallel, having substantially equal slopes and opposite signs; each applied distortion is suitable for establishing a variation of the average power spectrum in a transient condition; these two average powers are measured and the signals resulting from these measurements are compared. The equivalence or difference of these measurements indicates the absence or presence of fading, respectively.

According to a first feature of the invention, the measurements of the two average powers are different, in presence of fading, even if the notch frequency (fo) is not held within the band.

According to another feature of the invention, in case of fading and notch frequency (fo) coinciding with the central frequency of the data spectrum, the related voltages according to the characteristic curves with the power levels are compared.

The circuit for the embodiment of the distortion measurement according to the invention includes two parallel distortion blocks with equal slopes, but opposite signs, two average power testers and a comparator.

BRIEF DESCRIPTION OF THE DRAWINGS

The advantages of the invention shall become apparent when the following description of the preferred embodiment is read in conjunction with the attached drawings, in which:

FIGS. 2 to 11, 13 and 14 illustrate different configurations of the circuit; and.

DETAILED DESCRIPTION OF THE PREFERRED EMBODIMENTS

Figure 1:
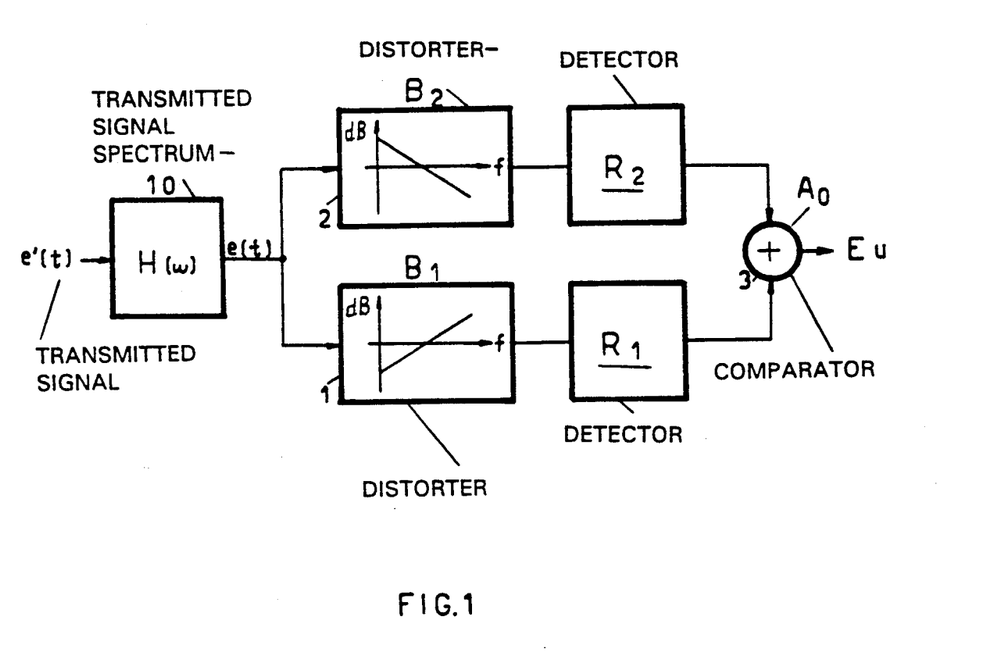
FIG. 1 shows a circuit of the device according to the invention.

The circuit of FIG. 1 includes: A) a transmission means symbolically represented by block H ($\omega$) (10); B) two blocks in parallel B1(1) and B2(2); C) two detectors of average power R1 and R2; and D) a comparator AO(3) of the signals obtained from detectors R1 and R2. Signal Eu at the output from AO(3) indicates the measure of the dissymmetry due to selective fading.

Signal e'(t) is the transmitted signal and forms the input of the common block, representing transmission channel H($\omega$) (10); the output of this block e(t) is the input signal of the system that must measure dissymmetry.

Figure 2:
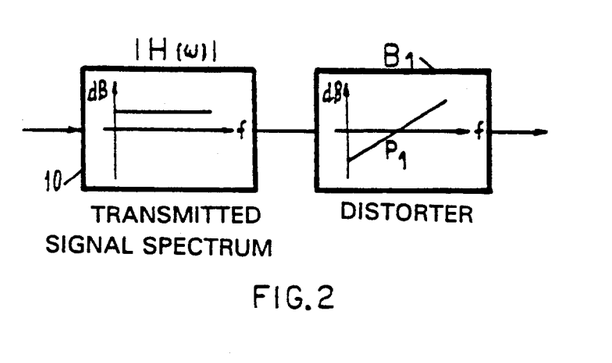
Figure 3:
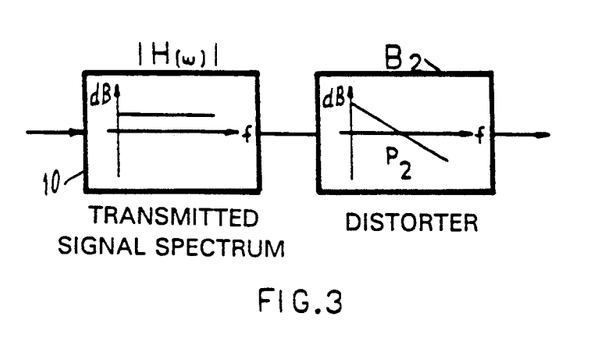

If in the absence of fading, H($\omega$) remains constant upon a frequency variation; hence, there will be no amplitude distortion. In this case, if we consider the transfer function formed by H($\omega$) and block B1, the two cascaded blocks of FIG. 2 will be obtained; inside the blocks, the trend of the module versus frequency is represented. If the transfer function formed by H($\omega$) and block 2 is considered, the two cascaded blocks of FIG. 3 will be obtained.

Figure 4:
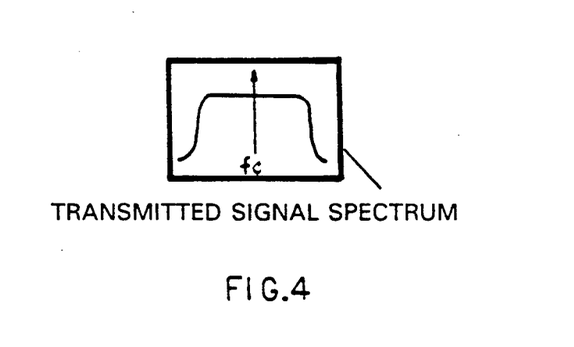

Therefore, the data spectrum in transmission (FIG. 4) is obtained at the input of block B1 and, at the input of block B2 without distortion and with a certain average power, the distortions caused by block B1 and block B2 are suitable to establish an average power variation of the spectrum in transient condition; however, as the spectrum, because it is undistorted, is symmetrical with respect to $f_c$ (the central frequency of the data spectrum) and the slopes P1 and P2 of the two blocks are equal and have opposite signs, the variation determined by block B1 is equal to the variation caused by block B2; therefore, detectors R1 and R2, installed downstream devices B1, B2 (FIG. 1), measure the average power that is identical; these two measurements are compared by means of a comparator, e.g. an operational amplifier AO, indicating the absence of fading (Eu=0).

Figure 5:
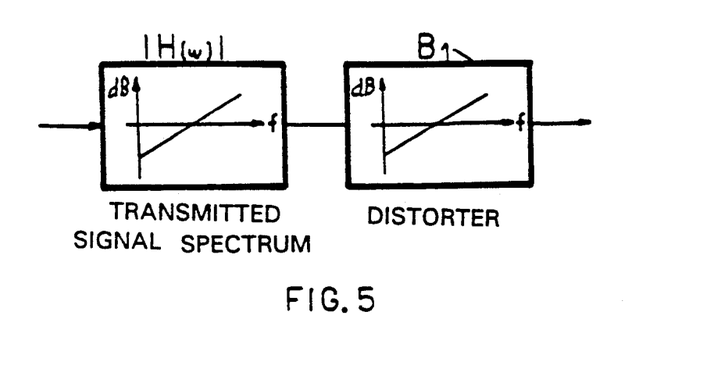
Figure 6:
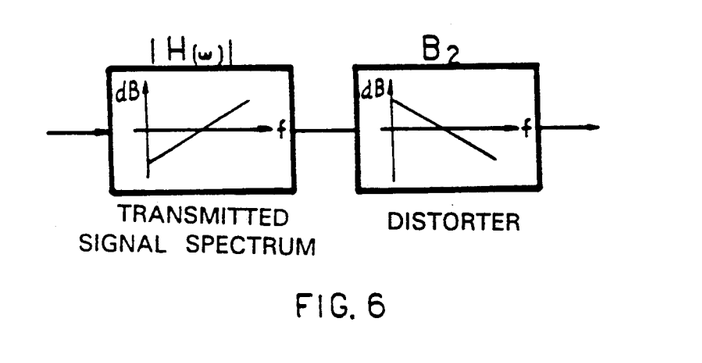

In contrast, in the presence of fading, frequency fo (notch frequency) is not within the system bandwidth, module H($\omega$) has an in-band trend that can be represented by a slope assumed to be the slope of FIG. 5 and FIG. 6.

It can be demonstrated that the average power of data spectrum B1 is higher than the average power of spectrum B2; hence the power measured by the two detectors R1 and R2 is different. Therefore, these two measurements, compared by a simple operational amplifier, indicate the presence of fading (Eu≠0).

Figure 8:
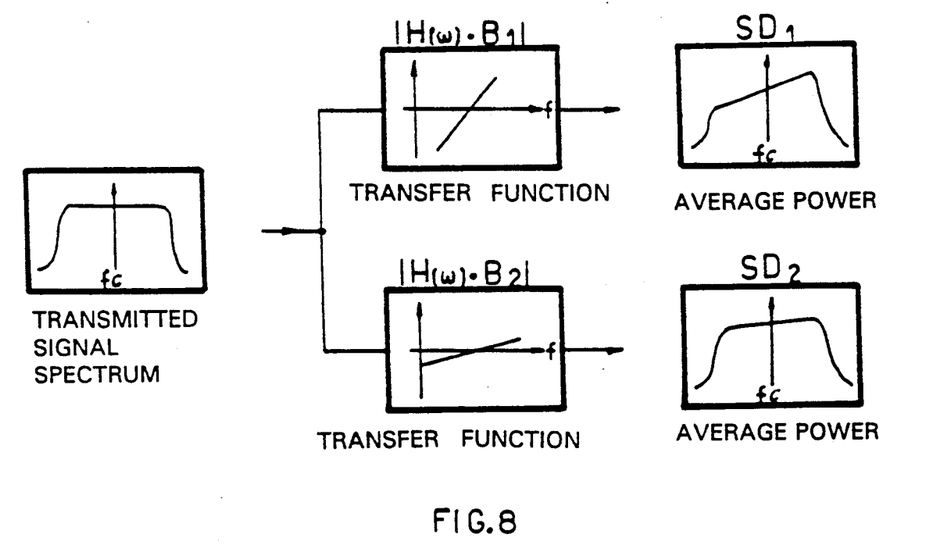
Figure 9:
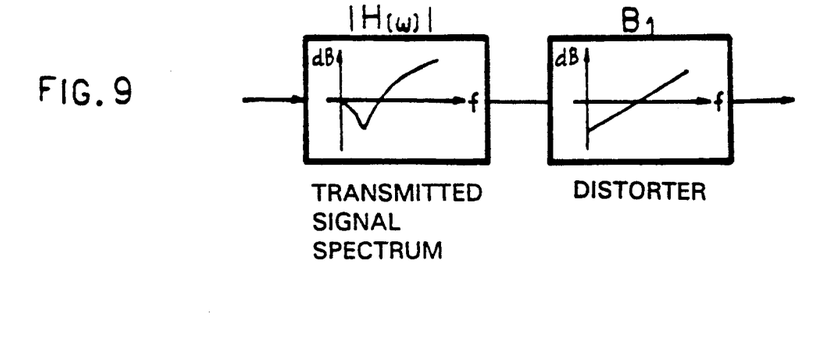
Figure 10:
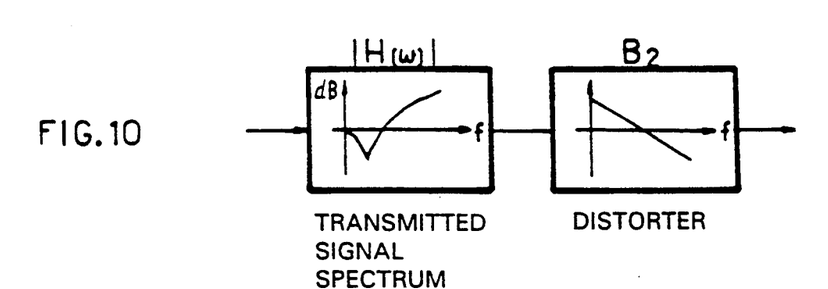
Figure 11:
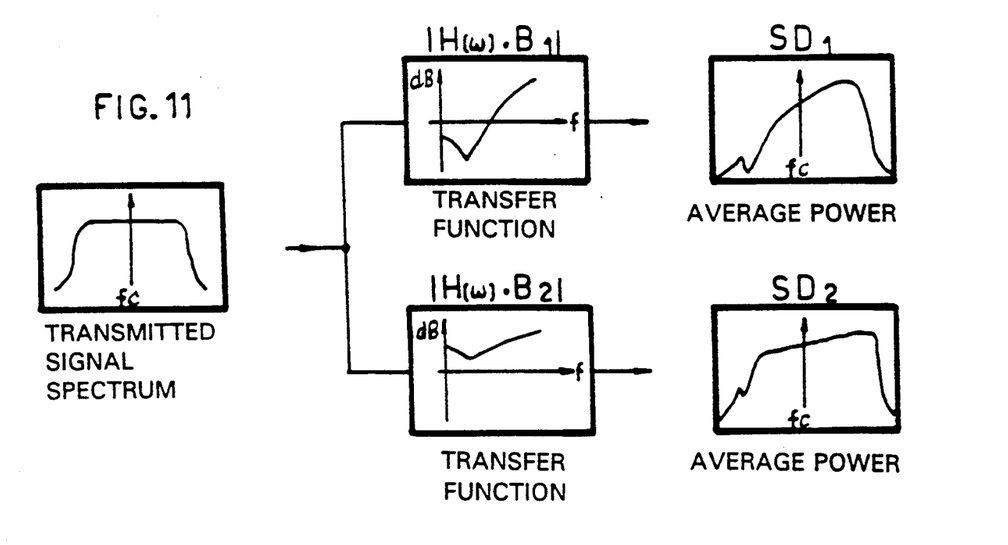

The power measurements of the two detectors are also different if fo is held within the band as shown in FIGS. 9 and 10; in fact, one block tends to reduce distortion, whereas the other block tends to increase it. Therefore, a schematization similar to that indicated in FIG. 8 can be made, as shown in FIG. 11.

Figure 7:
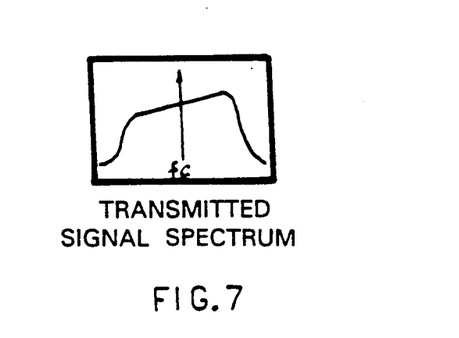

In this case, the data spectrum in transmission arrive arrives at the input of block B1 and B2 (FIG. 7) already distorted; block B1 increases, whereas block B2 reduces this distortion. This situation can be represented by the scheme illustrated in FIG. 8. It can be demonstrated that the average power of data spectrum 1 (SD1) is higher than the average power of data spectrum 2 (SD2). Therefore the power measurements of the two detectors R1 and R2 are again different. The only case in which the device does not indicate the presence of fading, when it is present, is the situation wherein fo=fc.

The output of the detectors is a voltage that is related, according to a certain characteristic curve, to the power level at the input; the higher the power level, the higher the voltage value at the output and vice versa; in this manner, it is clear that, if the average power of data spectrum 1 (SD1) is higher than the average power of data spectrum 2 (SD2), the output voltage of detector R1 is higher than the output voltage of detector R2. The difference of the two voltages not only indicates whether fading is present or not, but also whether fo is located on the right-hand or on the left-hand side of $f_c$; further this difference is also a quality index of the value of band distortion, i.e. the higher the difference between the two voltages, the greater the distortion is and vice versa.

The system according to the invention has further advantages, developments and applications. In particular, by processing the voltages detected by the dissymetry tester, it is possible to extract also the information related to the central notch, thus obtaining a dispersion tester (the dispersion is considered as amplitude distortion).

The block diagram shown in FIG. 12 represents once again the dissymmetry tester, at the output of which are supplied two voltages V1 and V2 related to the dissymmetry of the data spectrum.

The information related to fading with central notch is achieved by summing the two detected voltages and comparing the sum with a reference voltage representing absence of fading.

An Automatic Gain Control (AGC) is presumably provided at the input of the distortion detector. The AGC is absolutely necessary in this application because the module was inserted after a locking device. This causes a level stability upon a fading parameters change, which makes processing in the central band of the data spectrum inefficient. To overcome this drawback, an AGC with a selective filter Fs is added.

If the module is not used after the locking device, the AGC becomes redundant.

Therefore, the dispersion tester has three voltages V1, V2, V3; these voltages supply the information related to the amplitude distortion caused by selective fading.

The distortion measurement thus obtained allows one to generate a switching criterion or control, to oppose selective fadings, that can create dispersions, i.e. amplitude distortions on the data spectrum modulated on a transmission carrier wave.

Until today, the generation of the switching control was based on "BER" measurements (Bit Error Rate) made at the base-band.

The method used is the parity method, i.e. the number of even ones or odd ones, counted in each receive frame, are compared during a certain time period with the number of even ones or odd ones, counted in the same transmit frames. When the number of parity discordances tested in a certain time slot exceed a certain number, the measurement block of the error rate supplies the alarm.

There are two alarms: the alarm generated when the BER is equal to $10^{-3}$ and the alarm generated when the BER is equal to $10^{-6}$; the first alarm clearly has higher priority than the second alarm.

Figure 13:
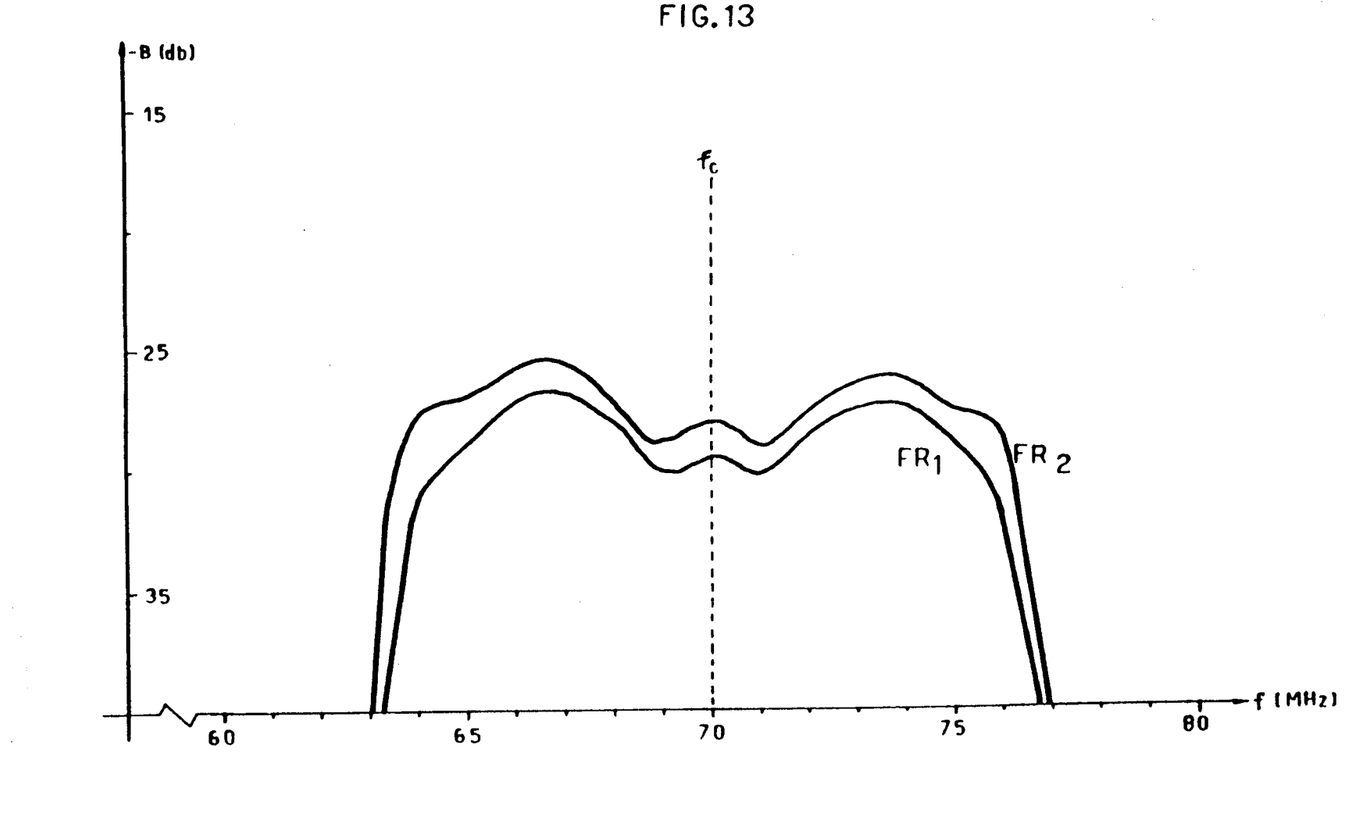

If the so-called signatures FR1 and FR2 are drawn (i.e. the graphics that put in relation the parameters of the model representing selective fading and an error rate) related to a $BER=10^{-3}$ and a $BER=10^{-6}$ for a given modulation-demodulation system, e.g. for an amplitude modulation system in quadrature 4 QAM/34 Mbit, the curves of FIG. 13 are obtained.

It can be noticed that in these curves FR1 and FR2 have very near behaviors, so that the $BER=10^{-6}$ and $BER=10^{-3}$ alarms often are almost simultaneous.

If we consider that $BER=10^{-3}$ represents the out of service threshold, it can be understood that it is absolutely necessary to generate a further alarm criterion which is a frequency leading or anticipation with respect to the signature drawn for $BER=10^{-6}$. Moreover, it must be observed that for generating the above described switching controls, is it absolutely necessary that errors be detected at the base band in order to establish an error rate.

According to an advantageous feature, the invention is also useful for the generation system of the switching criterion which should not have any of the above mentioned inconveniences and supply well spaced and enlarged signatures.

The invention also allows one to generate the desired leading alarm criterion with respect to the signature drawn for $BER=10^{-6}$.

The invention allows for advantageous applications in the system structure. In fact, if the device is supposed to be used in a (1+1) switching system, a transmission channel and a standby channel, switching to the standby radio beam is considerably leading or in anticipation with respect to the error conditions.

As regards this matter, field trial tests were made, verifying that the preceding statement is true, evidencing that the only case in which the system loses efficiency is when the standby beam is not available, because it is affected by equal or major error rates. In the case in which a switching system (n+1)/(n+2) is used; the use, of the device is of great importance, because before switching, it is necessary to align the standby to the channel that is going towards an error condition. This alignment clearly requires a certain time period, and for this reason it is extremely important to use a device that allows one to perform fast switching before detecting errors at the receive end.

The advantages supplied by using this device make switching more efficient, preventing it from being carried out in error conditions. Limiting the error conditions improves the performances of a digital radio link, and more precisely reduce the error criteria (CCIR recommendations): Severely Errored Seconds (SES, BER=10⁻³), Degraded Minutes (DM, BER=10⁻⁶) Errored Seconds (ES, seconds with at least one error), Residual Bit Error Ratio (RBER).

For the switching criterion implementation, an IF measurement of the distortions in the data spectrum is performed and the information of this measurement is processed for drawing a curve (IF signature) with reference to a BER signature equal to the conventional $10^{-6}$; this IF signature represents the curve of the values corresponding to the distortions due to selective fading, which evolve towards an error condition for the adopted modulation-demodulation type. The IF signature generates a frequency leading or anticipation by extending over a frequency range much more extended than the range of the $10^{-6}$ signature, with respect to the amplitudes of which it shows wider amplitudes with a considerable gap between the two curves.

The related device has a circuit consisting of at least two triggers is added to the distortion measurement circuit.

Figure 14:
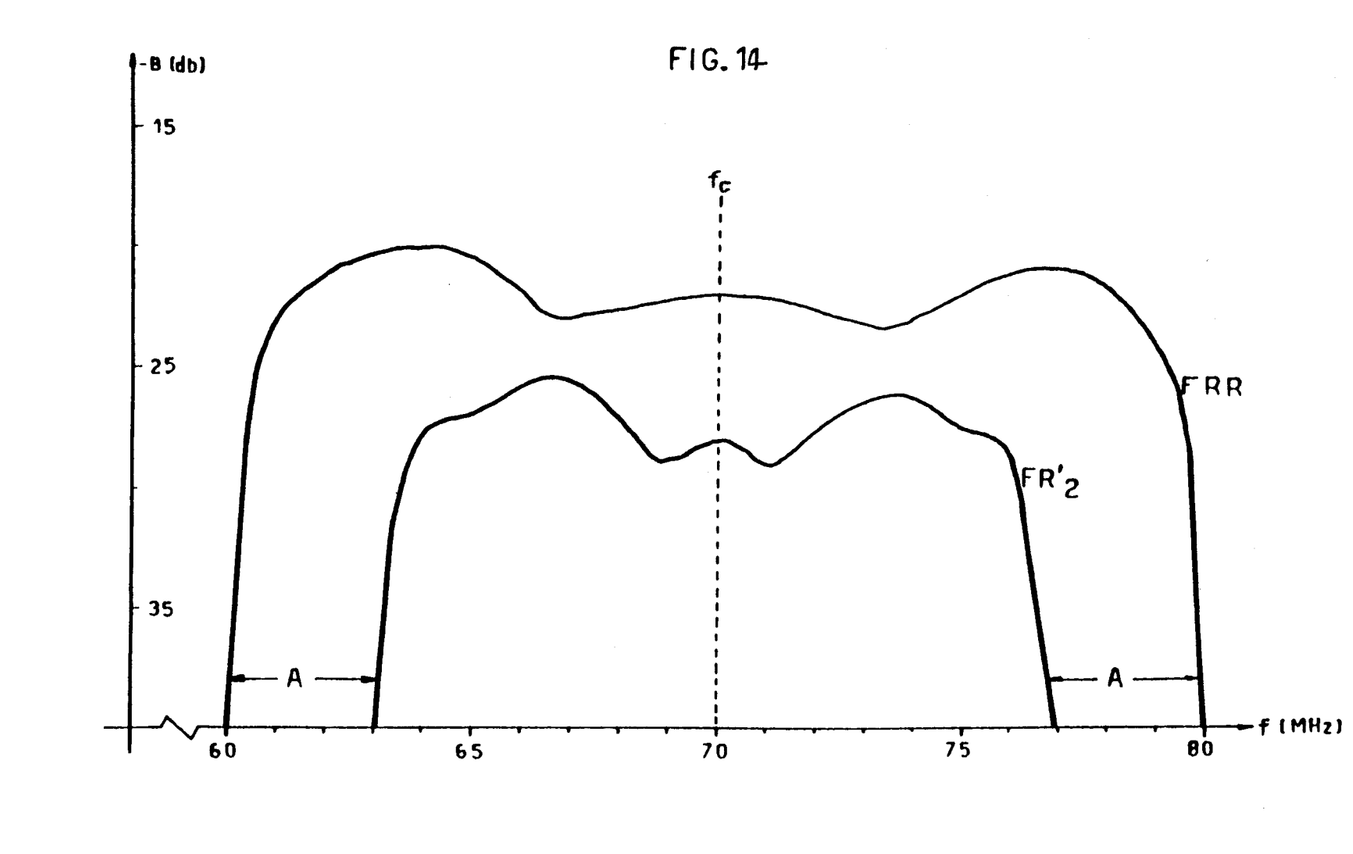
Figure 15:
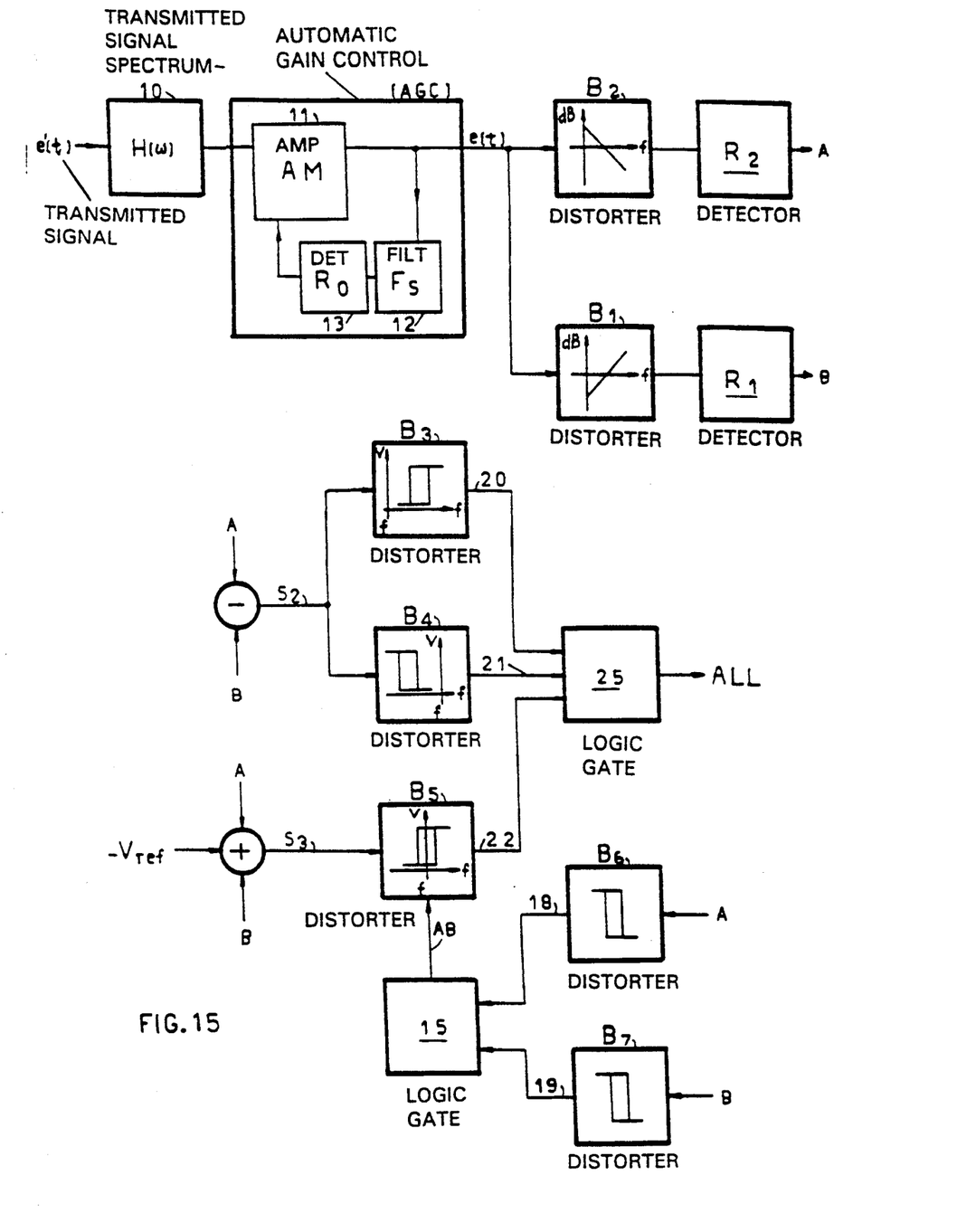

The different features and advantages of the invention are better shown in the description of the set up represented in FIGS. 14 and 15.

FIG. 14 clearly shows that the comparison is no longer between the BER $10^{-6}$ (FR2) signature and the BER $10^{-3}$ (FRI) signature (as shown in FIG. 13, they are generally too near to each other), but instead between the BER $10^{-6}$ (FR'2) signature and a reference FRR (IF) signature drawn at IF, i.e. where the selective fading parameters exceed the threshold that causes the alarm activation.

In other words, the FRR curve at IF is the curve corresponding to the selective fading distortions evolving towards an error condition for the adopted type of modulation-demodulation (in this case 4 QAM/34 Mbit).

FIG. 14 indicates by A the new alarm criterion frequency leading or anticipation with respect to the FR'2 signature drawn for $BER=10^{-6}$.

Figure 12:
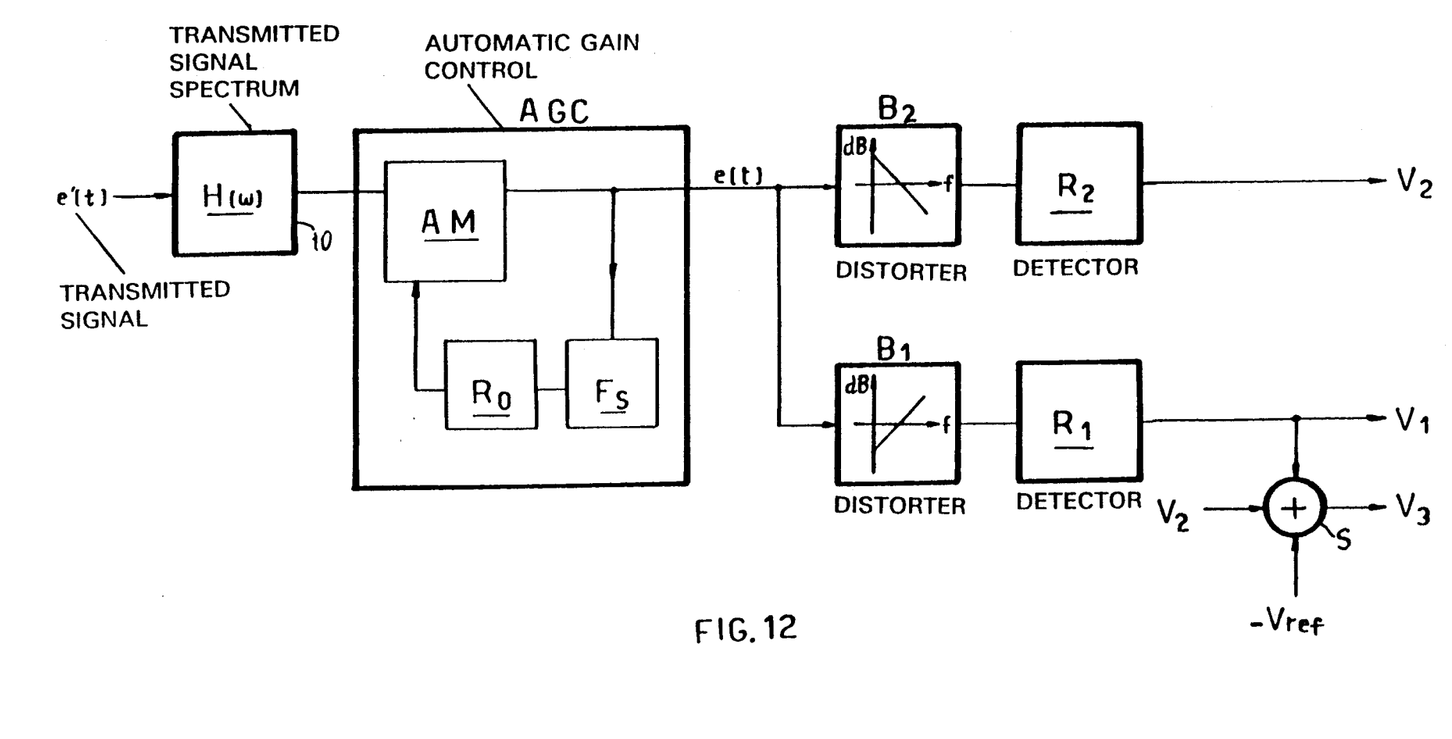
FIGS. 12 and 15–17 represent advantageous applications.

FIG. 15 shows a preferred embodiment of the device according to the invention. The first part of the device, that is the distortion detector, is substantially the same circuit as shown in FIG. 12: it includes a transmission means symbolically represented by block H (ω) (10), an AGC (BO) with amplifier AM (11), selective filter Fs (12) and detector (13), and the two branches, each one of which including block B1, respectively B2 with curves having equal slopes, but opposite signs and detector R1, respectively R2. Signals A and B at the output from R2, and R1 respectively, are now subtracted in S1 and summed up in A1. Signal S2 at the output from S1 is applied to the two blocks B3 and B4, the voltage frequency characteristics of which are represented inside the rectangle of the related block; the characteristics (V vs f) are equal but symmetrical with respect to central frequency (fc) of the data spectrum.

Also reference voltage VRef is applied to adder A1 of A and B, and output signal S3 is applied to block B5, that has the characteristic V (f) centered in $f_c$. Enabling AB for block B5 is given by circuit 15, that receives outputs 18 and 19 from blocks B6 fed by A, and B7 fed by B respectively.

Signals 20 at the output from B3, 21 at the output from B4, and 22 at the output from B5 are applied to the other circuit 25 (nNAND, nNOR or similar, as in 15) that supplies alarm signal ALL.

The distortion measurement also allows one to embody an adaptive equalizer using dissymmetry detection of the data spectrum; more particularly, the invention relates to a system for obtaining an efficient countermeasure to selective fading by means of adaptive equalization of amplitude only at intermediate frequency (IF), i.e. equalizing any distortion of the transmission channel module and leaving the group delay distortions unaltered.

Traditionally, adaptive equalization is made with the distortion measurement, i.e. the amplitude dispersion carried out by the power measurement of the data spectrum around 'n' frequencies.

According to an important feature of the invention, dispersion detection over the whole band is made by using dissymmetry measurement and this measure drives an equalization structure in a critical manner.

The related device includes a delay line and a multiplier in the equalizer and a rotation block of the equalizer signal, two adder notches, two detectors and one comparator in the dissymmetry tester.

Figure 16:
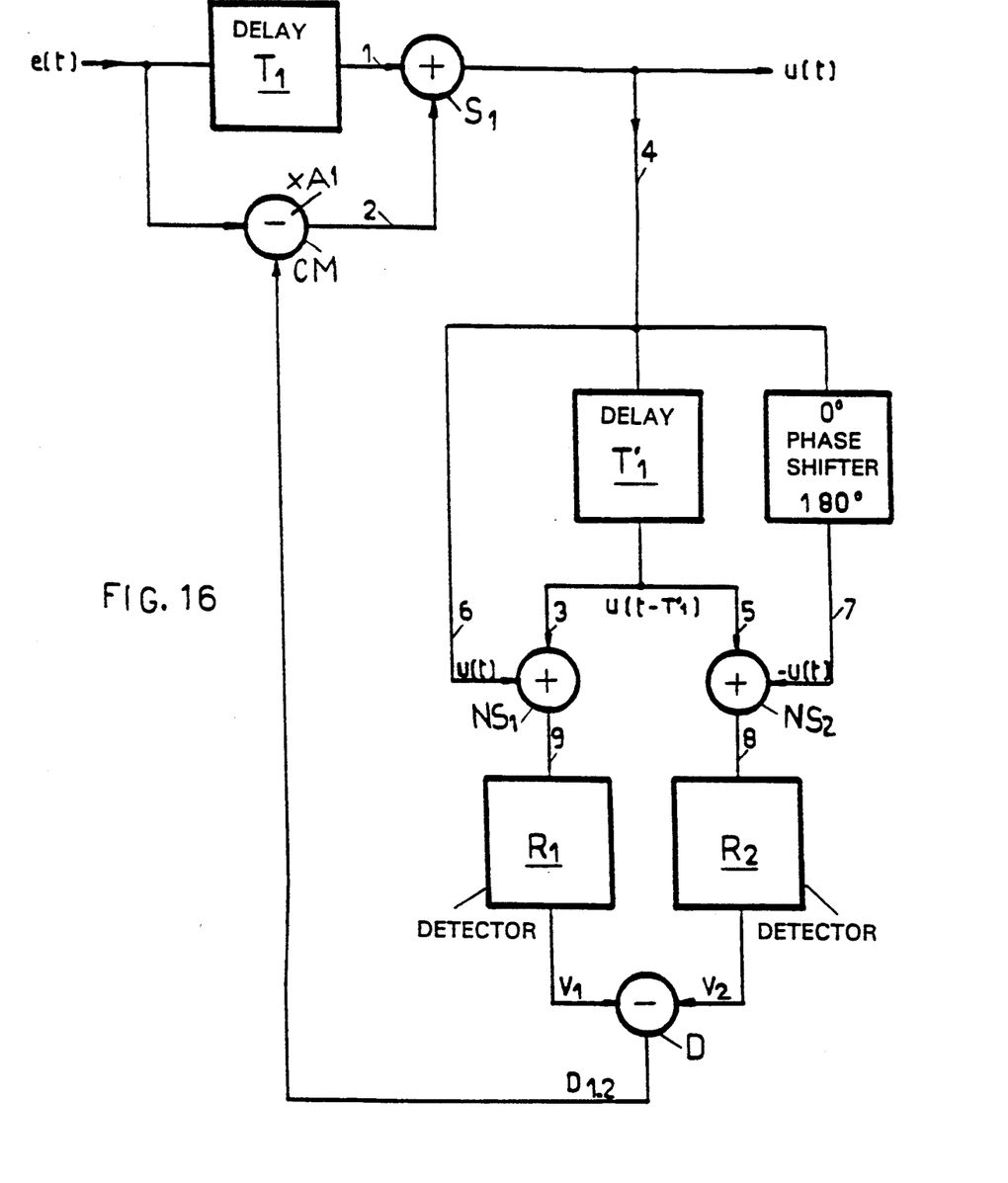
Figure 17:
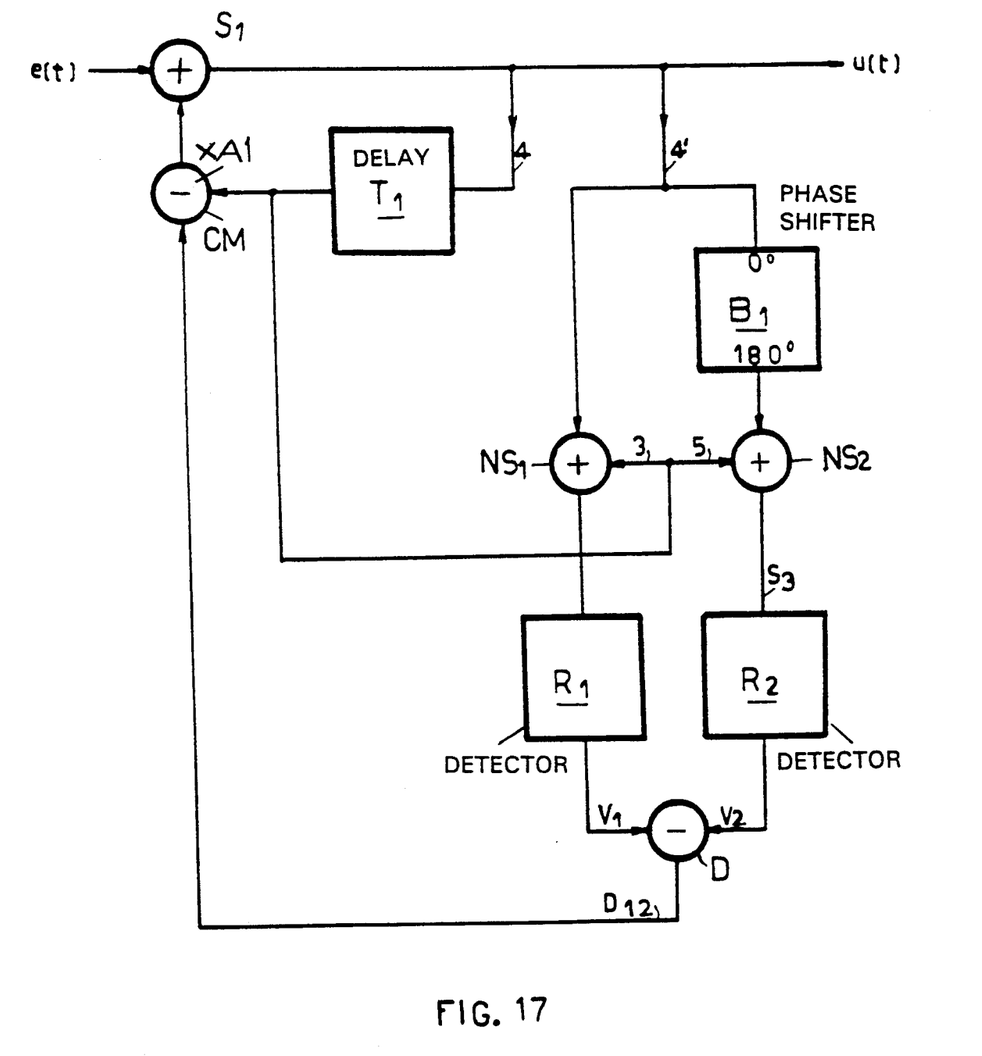

The different characteristics and advantages shall appear better from the following description of the two preferred equalizer embodiments, represented in the attached drawing, in which FIGS. 16 and 17 are both circuit schemes, but with different structures of adaptive IF equalizers controlled by a measurement system for dissymmetries of the data spectrum.

FIG. 16 shows an equalizer made up of a delay line T1 installed in parallel to multiplier CM having a multiplying coefficient A1, while the measurement system for the data spectrum dissymmetries works on signal u(t) at the output from the equalizer.

Input signal e(t) to be equalized is applied to T1 and CM, the output signals of which 1 and 2 respectively, are summed up in adder S1, from where outputs equalized signal u(t), on which, according to an important feature of the invention, the measurement system of dissymmetries works after the equalizer itself.

The signal u(t), as regards dissymmetry detection, is summed up in two different adding notches NS1 and NS2; in the first notch NS1, signal u(t-T'₁) outgoing from delay line T'₁ (connection 3) and signal u(t) (connection 6) are summed up.

Second adder NS2 sums up signal u(t-T'₁) (connection 5) and signal -u(t) drawn from the 180° end of rotation block B1 (line 7).

Signals 9 and 8, output from NS1, and NS2 respectively are each applied to detector R1, respectively R2, the two measured voltages V1 and V2 are compared in notch D that calculates its difference.

Comparison signal $D_{12}$ is sent back to multiplier CM, that supplies the equalizing factor to S1.

FIG. 17 shows the circuit blocks that are substantially equal, but the equalizer is made up of a feedback structure that shows on branch 4 delay line T1 in feedback and multiplier CM with multiplying coefficient A1; the measurement system of the dissymmetries driving said equalizer is made in a way and similar to that shown in FIG. 16, thus carrying phase shift block B1, the two summing notches NS1 and NS2, the two detectors R1 and R2 and comparator D.

We claim:
1. A method for detecting data spectrum distortion in transmitted digital signals having a frequency spectrum and a central frequency, in particular distortion due to selective fading, comprising the steps of:

(a) submitting the transmitted signal to two parallel distortions having substantially equal slopes, opposite signs and a common central frequency, each of which causes a variation in the average power of the frequency spectrum of the transmitted signal;

(b) measuring the two average powers resulting from the two parallel distortions; and (c) comparing the two measured average powers;

wherein the equivalence or difference between the two measured average powers indicates the absence or presence of fading, respectively, in the transmitted signal.

2. A method as recited in claim 1, wherein, if fading is present and if the fading has a notch frequency which is different from the central frequency of the transmitted signal, the difference between the two measured average powers indicates whether the notch frequency of the fading has a higher or lower frequency than the central frequency of the transmitted signal.

3. A method as recited in claim 1, wherein, if fading is present and even if the fading has a notch frequency which is equal to the central frequency of the transmitted signal, the two measured average powers are processed to obtain a distortion measurement.

4. A method as recited in claim 1, further comprising the step of generating an equalizing signal to oppose selective fadings that may create distortion of the frequency spectrum of the transmitted signal, the measurement of the distortion of said spectrum being carried out at IF, and the information of this measurement being processed to obtain an IF signature with reference to a bit error rate (BER) of $10^{-6}$, the IF signature representing a curve corresponding to the distortions due to selective fading.

5. A device for detecting data spectrum distortion in transmitted digital signals having a frequency spectrum distributed symmetrically over a central frequency, in particular distortion due to selective fading, comprising:

(a) means for submitting the transmitted signal to two parallel distortions having substantially equal slopes, opposite signs and a common central frequency, each of which causes a variation in the average power across the frequency spectrum of the transmitted signal;

(b) means for measuring the two average powers resulting from the two parallel distortions; and (c) means for comparing the two measured average powers;

wherein the equivalence or difference between the two measured average powers indicates the absence or presence of fading, respectively, in the transmitted signal.

6. A device as recited in claim 5, further comprising means for processing the two measured average powers to obtain a distortion measurement, even in presence of fading having a notch frequency equal to the central frequency of the transmitted signal.

7. A device as recited in claim 6, further comprising means for generating an equalizing signal to oppose selective fadings that may create distortion of the frequency spectrum of the transmitted signal, the measurement of the distortion of said spectrum being carried out at IF, and means for processing the information gathered from this measurement to obtain an IF signature with reference to a bit error rate (BER) of $10^{-6}$, the IF signature representing a curve corresponding to the distortions due to selective fading.

* * * * *